(12) United States Patent
Reiner et al.

(10) Patent No.: US 9,637,100 B2
(45) Date of Patent: May 2, 2017

(54) HYDRAULIC UNIT FOR A SLIP CONTROL SYSTEM OF A HYDRAULIC VEHICLE BRAKE SYSTEM

(71) Applicant: Robert Bosch GmbH, Stuttgart (DE)

(72) Inventors: Juergen Reiner, Gestratz (DE); Matthias Hurst, Immenstadt (DE); Guenther Schnalzger, Blaichach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/738,289

(22) Filed: Jun. 12, 2015

(65) Prior Publication Data

US 2015/0360658 A1 Dec. 17, 2015

(30) Foreign Application Priority Data

Jun. 13, 2014 (DE) .................. 10 2014 211 382

(51) Int. Cl.
| | |
|---|---|
| *B60T 8/40* | (2006.01) |
| *B60T 8/42* | (2006.01) |
| *B60T 13/14* | (2006.01) |
| *B60T 8/34* | (2006.01) |
| *F16L 55/05* | (2006.01) |

(52) U.S. Cl.
CPC ............ *B60T 8/4068* (2013.01); *B60T 8/341* (2013.01); *B60T 8/42* (2013.01); *B60T 13/148* (2013.01); *F16L 55/05* (2013.01)

(58) Field of Classification Search
CPC ........... B60T 8/42; B60T 8/4068; F16L 55/05
USPC ................................ 138/30, 31; 303/DIG. 10
See application file for complete search history.

(56) References Cited

U.S. PATENT DOCUMENTS

| 5,058,961 A * | 10/1991 | Mergenthaler | B60T 8/341 303/115.4 |
|---|---|---|---|
| 5,590,936 A | 1/1997 | Reuter | |
| 7,090,310 B2 * | 8/2006 | Kondo | B60T 8/4068 303/87 |
| 7,240,696 B2 * | 7/2007 | Schlitzkus | B60T 17/00 138/26 |
| 2004/0231738 A1 * | 11/2004 | Suzuki | F15B 1/103 138/31 |
| 2010/0319334 A1 * | 12/2010 | Kley | B60T 8/4068 60/325 |

(Continued)

FOREIGN PATENT DOCUMENTS

| DE | 3912935 C2 * | 5/2003 | ............ B60T 8/341 |
|---|---|---|---|
| DE | WO 2016096188 A1 * | 6/2016 | ............ F16L 55/05 |

(Continued)

*Primary Examiner* — Thomas J Williams
(74) *Attorney, Agent, or Firm* — Maginot, Moore & Beck LLP

(57) ABSTRACT

A hydraulic unit for a slip control system of a hydraulic vehicle brake system comprises a hydraulic block including a socket, a first port, a pressure change damper, and a second port. The socket has a base and defining a first interior. The first port is located at the base of the socket. The pressure change damper defines a second interior and is positioned in the socket in engagement with the first port. The first port is in fluidic communication with the second interior. The second port is in fluidic communication with the second interior via a portion of the first interior outside of the pressure change damper.

5 Claims, 1 Drawing Sheet

(56) References Cited

U.S. PATENT DOCUMENTS

| | | | | |
|---|---|---|---|---|
| 2014/0116555 A1* | 5/2014 | Blosch | ............... | B60T 8/4068 138/30 |
| 2015/0375723 A1* | 12/2015 | Hurst | ............... | B60T 8/4068 137/565.11 |
| 2016/0176387 A1* | 6/2016 | Speer | ............... | F16L 55/05 303/10 |

FOREIGN PATENT DOCUMENTS

| | | |
|---|---|---|
| EP | 1 623 118 B1 | 2/2006 |
| WO | 2011/028676 A2 | 3/2011 |
| WO | 2011/097240 A2 | 8/2011 |

* cited by examiner

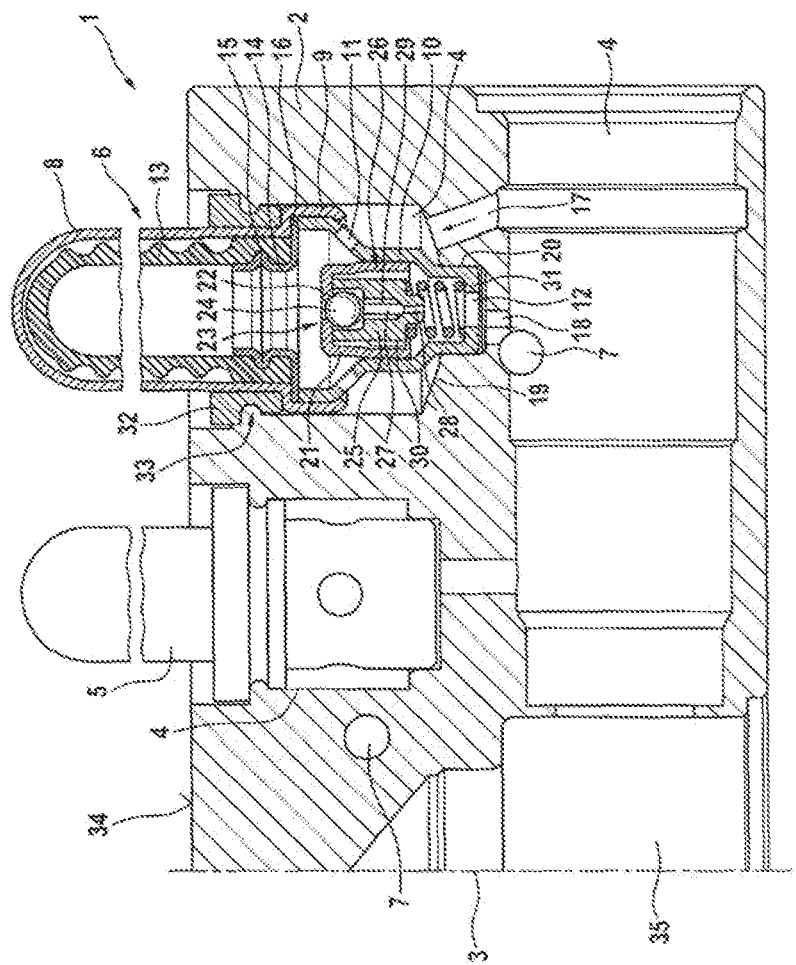

HYDRAULIC UNIT FOR A SLIP CONTROL SYSTEM OF A HYDRAULIC VEHICLE BRAKE SYSTEM

This application claims priority under 35 U.S.C. §119 to patent application no. DE 10 2014 211 382.2, filed on Jun. 13, 2014 in Germany, the disclosure of which is incorporated herein by reference in its entirety.

The disclosure relates to a hydraulic unit for a slip control system of a hydraulic vehicle brake system.

BACKGROUND

Slip control systems of hydraulic vehicle brake systems have hydraulic units with hydraulic components for slip control. Such hydraulic components are solenoid valves, check valves, hydraulic pumps, hydraulic accumulators, damper chambers and restrictors. For mechanical fastening and hydraulic interconnection of the hydraulic components, such hydraulic units have hydraulic blocks. The hydraulic blocks are normally cuboidal flat blocks made of metal, e.g. an aluminum alloy. Sockets for the hydraulic components are formed in the hydraulic blocks, typically being embodied as blind holes of stepped diameter into which the hydraulic components are inserted, pressed or installed in some other way and fastened, for example, by swaging. Lines are produced by drilling the hydraulic block, said lines extending predominantly parallel to edges of the hydraulic block, i.e. in a Cartesian pattern, and hydraulically interconnecting the sockets and the hydraulic components installed therein. A hydraulic block equipped with the hydraulic components for slip control can be understood as a hydraulic unit.

The hydraulic block or hydraulic unit is connected to a brake master cylinder by brake lines, and hydraulic wheel brakes are connected to the hydraulic unit or hydraulic block by brake lines.

European Patent EP 1 623 118 B1 discloses a hydraulic block of this kind for an antilock control system in a hydraulic vehicle brake system, having a pressure change damper which is arranged in a socket in the hydraulic block and communicates via a connecting line produced as a hole with an outlet of a piston pump, which is likewise arranged in a socket in the hydraulic block. At the same time, the pressure change damper communicates via the outlet of the piston pump with an isolation valve, by means of which the hydraulic unit is connected to a brake master cylinder, and with brake pressure buildup valves, by means of which the wheel brakes are connected to the hydraulic unit. The pressure change damper is used to damp pressure surges, pressure pulsation and pressure oscillations of brake fluid at the outlet of the piston pump. The pressure change damper of the known hydraulic unit has just one port and no separate inlet and outlet.

SUMMARY

A pressure change damper of the hydraulic unit according to an embodiment of the disclosure has two ports, one of which forms an inlet of the pressure change damper and communicates with an outlet of a piston pump of the hydraulic unit and the other forms an outlet of the pressure change damper, and having an isolation valve, by means of which the hydraulic unit can be connected or is connected to a brake master cylinder of a hydraulic vehicle brake system, and having one or more brake pressure buildup valves, by means of which the one or more wheel brakes can be connected or is/are connected to the hydraulic unit. According to the disclosure, the hydraulic block has two ports for the pressure change damper, which are drilled, for example, and can also be understood as lines or connecting lines in the hydraulic block, one of which forms an inlet and the other forms an outlet for the pressure change damper. One of the two ports issues at a base of the socket for the pressure change damper in the hydraulic block; the other port can likewise issue at the base of the socket for the pressure change damper but at a different location from the first port, or the other port does not issue at the base but, for example, at a circumference of the socket for the pressure change damper in the hydraulic block. The pressure change damper is arranged in the socket in the hydraulic block in such a way that it rests on the one port for the pressure change damper and thereby separates the two ports hydraulically, thus ensuring that brake fluid which flows in through the one port must flow through the pressure change damper in order to be able to flow out through the other port. A brake fluid flow directly from one port into the other port, past the pressure change damper, is excluded—apart from possible leakage. The compulsory flow through the pressure change damper ensures damping of pressure surges, pressure pulsation and pressure oscillations of brake fluid or at least improves damping. By way of example, the pressure change damper can rest internally against a circumference of the one port, internally against a circumference of a cylindrical or conical countersink of the one port or, while surrounding the port, can rest on the base of the socket for the pressure change damper. Sealing contact of the pressure change damper in the socket, which separates the two ports for the pressure change damper in the hydraulic block hydraulically in a pressure tight manner from one another is preferred although it is not essential for damping. In the event of leakage, a brake fluid flow from one port directly into the other port, past the pressure change damper, is small in comparison with the brake fluid flow through the pressure change damper, and the brake fluid flow flowing past the pressure change damper is greatly restricted because it has to flow through a narrow cross section between the socket of the hydraulic block and the pressure change damper resting in the socket. The high degree of restriction likewise causes damping. Pressure tight sealing of the pressure change damper in the socket of the hydraulic block is essentially indispensable for pressure tight hydraulic separation of the two ports of the pressure change damper if the pressure change damper has a check valve which closes against an inflow of brake fluid from one brake master cylinder through an isolation valve, when the latter is open, and through the port, which per se forms the outlet of the pressure change damper, into the pressure change damper. At least one such check valve is provided by embodiments of the disclosure to ensure that, in the case of brake actuation by means of the brake master cylinder, no brake fluid flows out of the brake master cylinder into the pressure change damper, something that lengthens an actuating travel of the brake master cylinder, i.e. a brake pedal travel or a brake lever travel, and would cause an unwanted "soft" brake pedal or hand brake lever feel because of elasticity of the pressure change damper.

The dependent claims relate to other advantageous embodiments and developments.

Further features of the disclosure will become apparent from the following description of an embodiment of the disclosure in conjunction with the claims and the drawing.

The individual features can be implemented individually or jointly in any desired combination in embodiments of the disclosure.

BRIEF DESCRIPTION OF THE DRAWINGS

The FIGURE shows a section through one half of a hydraulic block of a hydraulic unit according to the disclosure.

DETAILED DESCRIPTION

The hydraulic unit 1 according to the disclosure, which is shown in the drawing, is part of a slip control system (otherwise not shown) of a hydraulic vehicle brake system. Such slip control systems are known and they are used for antilock control, traction control and/or vehicle-dynamics or antiskid control. The abbreviations ABS, ASR, FDR and ESP are customary for these control systems. The hydraulic unit 1 has a cuboidal hydraulic block 2, which consists, for example, of an aluminum alloy and has been machined. In elevation, the hydraulic block 2 is rectangular, almost square, and it is flat, namely approximately ¼ to ⅓ as thick as it is long or wide. The drawing shows a section through one half of the hydraulic block 2 on one side of the longitudinal center plane 3, with respect to which the hydraulic block 2 is symmetrical. The hydraulic block 2 has sockets 4 for hydraulic components of the slip control system. Such components are solenoid valves, of which a suction valve 5 is shown by way of example, check valves, hydraulic accumulators and piston pumps as hydraulic pumps (not shown), and pressure change dampers 6 according to the disclosure. The sockets 4 into which the hydraulic components are inserted or in which they are arranged are embodied as blind holes or through holes of stepped diameter. The sockets 4 and the hydraulic components arranged therein are interconnected hydraulically by lines 7, which, like the socket 4, are produced by drilling the hydraulic block 2. The hydraulic block 2 serves for the mechanical fixing and hydraulic interconnection of the hydraulic components of the slip control system. The drilling of the hydraulic block 2 and the arrangement of the hydraulic components is Cartesian, i.e. the sockets 4 for the hydraulic components, the lines 7 for the hydraulic interconnection of the hydraulic components and the hydraulic components are arranged in a Cartesian pattern, i.e. parallel or at right angles to one another and to surfaces and edges of the hydraulic block 2. This does not exclude one or more oblique holes.

The pressure change damper 6 has a damper housing 8 which is dome-shaped, i.e. is in the form of a cylindrical tube and closed by a hemisphere at one end. At its open end, which is situated in the socket 4 in the hydraulic block 2, the damper housing 8 of the pressure change damper 6 has a diameter step 9 of enlarged diameter, into which an oppositely oriented valve housing 10 is inserted. The valve housing 10 has a stepped diameter with frustoconical diameter steps, although radial diameter steps are also possible. One of the diameter steps has holes distributed over a circumference as inlet openings 11 of the pressure change damper 6. An outlet opening 12 is provided coaxially in an end wall of the valve housing 10 remote from the damper housing 8 of the pressure change damper 6. In the damper housing 8, the pressure change damper 6 has a damper body 13 in the form of a corrugated tube made of an elastomer, one end of which is closed and the end of which that is adjacent to the valve housing 10 is open. A retaining ring 14 holds the open end of the damper body 13 in the damper housing 8 of the pressure change damper 6. The retaining ring 14 has an encircling bead 15, which engages in a groove in the open end of the damper body 13 and in this way holds the open end of the damper body 13. The retaining ring 14 furthermore has a flange 16, which is fixed between the segment 9 of increased diameter of the damper housing 8 and the valve housing 10.

Two ports 17, 18, of which one port 17 forms an inlet and the other port 18 forms an outlet, issue into the socket 4 for the pressure change damper 6. The port 17 forming the inlet issues eccentrically at a base 19 of the socket 4 for the pressure change damper 6, close to a circumference of the socket 4. This port 17 extends obliquely and is aligned in such a way that it can be drilled through a mouth of the socket 4. The other port 18, which forms the outlet, extends parallel to the axis and close to the center and issues by means of a coaxial cylindrical countersink 20 into the base 19 of the socket 4 for the pressure change damper 6. A hollow-cylindrical end of the valve housing 10 of the pressure change damper 6 is pressed into the countersink 20 of the port 18 forming the outlet, ensuring that it rests with a pressure tight seal on the circumference of the countersink 20. In this way, the two parts 17, 18 for the pressure change damper 6 in the hydraulic block 2 are separated hydraulically from one another, ensuring that brake fluid cannot flow directly from one port 17 into the other port 18 but has to flow into and out of the housing 10 and hence into and out of the pressure change damper 6 through the inlet opening 11 and the outlet opening 12 in order to pass from one port 17 to the other port 18.

A valve seat part 21, which has a central hole forming a valve seat 22 for a springless check valve 23, is pressed into the valve housing 10. The check valve 23 has a ball as a shutoff member 24, although this is not compulsory for the disclosure. The shutoff member 24 of the springless check valve 23 is arranged in a coaxial countersink in a cylindrical shutoff member 25 of a spring-loaded check valve 26. An axial through hole 27 leads from the countersink in which the shutoff member 24 of the springless check valve 23 is accommodated, through the shutoff member 25 of the spring-loaded check valve 26. The through hole 27 has a segment of small diameter, which forms a restrictor 28. In the segment of larger diameter, the through hole 27 has longitudinal ribs 29 projecting radially inwards, which extend as far as the entry of the through hole 27 into the countersink in which the shutoff member 24 of the springless check valve 23 is arranged. The longitudinal ribs 29 prevent the shutoff member 24 of the springless check valve 23 from blocking the through hole 27. On its outer side, the cylindrical shutoff member 25 of the spring-loaded check valve 26 has outward-projecting longitudinal ribs 30, which guide shutoff member 25 in an axially movable manner in the valve seat part 21 and allow a flow around shutoff member 25. As a valve spring 31, the spring-loaded check valve 26 has a helical compression spring, which is supported on the end wall of the valve housing 10 and presses shutoff member 25 against an end wall of the valve seat part 21, which forms a valve seat of the spring-loaded check valve 26.

The pressure change damper 6 is fixed in the socket 4 of the hydraulic block 2 by a "self-clinch" technique: for this purpose, a swaging collar 32 is arranged on the damper housing 8 in the socket 4, close to the mouth, said collar having on its outer side an encircling groove 33, into which material of the hydraulic block 2 is plastically deformed when it is pressed into the socket 4, holding the swaging collar 32 and sealing it pressure tightly in the mouth of the socket 4. The swaging collar 32 rests against the diameter step 9 of the damper housing 8 and in this way holds the pressure change damper 6 in the socket 4 and the end of the valve housing 10 in the countersink 20 of port 18 at the base of the socket 4.

The two ports 17, 18 issue into a socket 4 for a slip control piston pump (not shown). The ports 17, 18 are arranged in such a way that the port 17 forming the inlet of the pressure change damper 6 communicates with an outlet of the piston pump and the port 18 forming the outlet of the pressure change damper 6 communicates by means of a line 7 with the isolation valve (not shown), by means of which the hydraulic block 2 is connected to the brake master cylinder (likewise not shown), and to brake pressure buildup valves (not shown), by means of which the wheel brakes (not shown) are connected to the hydraulic block 2. Brake fluid delivered by the piston pump (not shown) flows through the port 17 forming the inlet, the socket 4 and the inlet openings 11 into the pressure change damper 6. The damper body 13 and, by virtue of their restricting effect, the check valves 23, 26 and the restrictor 26 damp pressure surges, pressure pulsation and pressure oscillations of the brake fluid from the piston pump. The brake fluid flows out of the pressure change damper 6 through the springless check valve 23 into the port 18 forming the outlet. During this process, the brake fluid must flow through the restrictor 28, improving damping. An increased pressure in the pressure change damper 6 opens the spring-loaded check valve 26, making available an additional flow cross section for the brake fluid from the piston pump. The two check valves 23, 26 are connected hydraulically in parallel with one another and the restrictor 28 is arranged hydraulically downstream of the springless check valve 23. Moreover, both check valves 23, 26 and the restrictor 28 are arranged hydraulically downstream of the pressure change damper 6.

If a brake pressure which passes through the socket 4 for the piston pump (not shown) is built up for brake actuation in the line 7 by means of the brake master cylinder (not shown), the check valves 23, 26 shut off, with the result that no brake fluid flows out of the brake master cylinder into the pressure change damper 6. As a result, the brake master cylinder does not displace any brake fluid volume into the pressure change damper 6, which would lengthen an actuating travel of the brake master cylinder and would cause an unwanted, soft "pedal feel" owing to elasticity of the damper body 13.

The pressure change damper 6 is arranged in the hydraulic block 2 in an axial plane of the socket 4 for the piston pump (not shown). The damper housing 8 projects perpendicularly from a flat side of the hydraulic block 2, which is here referred to as valve side 34. The solenoid valves of the hydraulic unit 1, of which the suction valve 5 is shown, also project from the valve side 34. The suction valve 5 is arranged in the hydraulic block 2 between the pressure change damper 6 and the longitudinal center plane 3 of the hydraulic block 2, parallel to the pressure change damper 7, in the same axial plane as the socket 4 for the piston pump. Like the pressure change damper 6, the suction valve 5 is secured and sealed off pressure tightly in the socket 4 by means of a self-clinch technique. The socket 4 for the piston pump issues radially into an eccentric space 35, which is formed as a blind hole of stepped diameter in the longitudinal center plane 3 of the hydraulic block 2. The eccentric space 35 serve to accommodate an eccentric (not shown), which can be driven by electric motor, for driving the piston pump (not shown).

When fitted with the hydraulic components, the hydraulic block 2 forms the hydraulic unit 1 of the slip control system of the hydraulic vehicle brake system (otherwise not shown).

What is claimed is:

1. A hydraulic unit for a slip control system of a hydraulic vehicle brake system, comprising:
    a hydraulic block including a socket, the socket having a base and defining a first interior;
    a first port located at the base of the socket;
    a pressure change damper positioned in the socket in engagement with the first port defining a second interior, the first port being in fluidic communication with the second interior; and
    a second port in fluidic communication with the second interior via a portion of the first interior outside of the pressure change damper,
    wherein the pressure change damper includes at least one check valve hydraulically positioned between the first port and the second port,
    wherein the at least one check valve includes two check valves hydraulically connected in parallel,
    wherein one of the two check valves is springless, and
    wherein another of the at least two check valves is spring-loaded.

2. The hydraulic unit according to claim 1, wherein:
    the first port defines a circumference; and
    the pressure change damper projects into the first port and rests against the circumference.

3. The hydraulic unit according to claim 1, wherein the pressure change damper rests sealingly on the first port.

4. The hydraulic unit according to claim 1, wherein the at least one check valve is positioned hydraulically at an outlet of the pressure change damper.

5. The hydraulic unit according to claim 1, wherein the pressure change damper includes a restrictor hydraulically positioned between the first port and the second port.

* * * * *